(No Model.)
W. COLE.
MANUFACTURE OF BUTTER.
No. 478,736. Patented July 12, 1892.
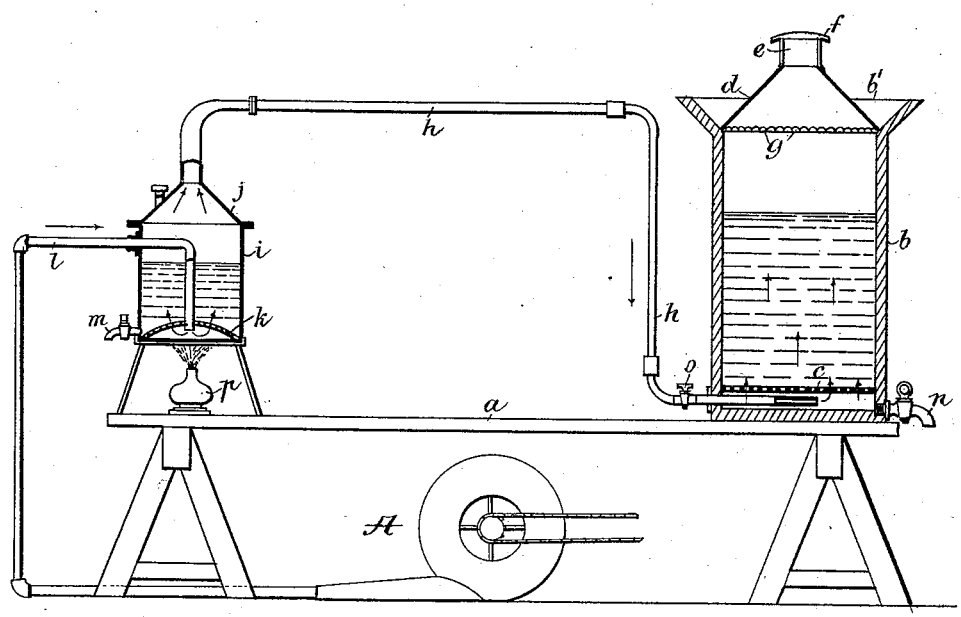
Witnesses.
Inventor.

United States Patent Office.

WALTER COLE, OF LONDON, ENGLAND.

MANUFACTURE OF BUTTER.

SPECIFICATION forming part of Letters Patent No. 478,736, dated July 12, 1892.

Application filed September 3, 1889. Serial No. 322,872. (No model.) Patented in England August 21, 1889, No. 13,197, and in Germany September 1, 1889, No. 53,215.

*To all whom it may concern:*

Be it known that I, WALTER COLE, a subject of the Queen of Great Britain, residing at London, England, have invented new and useful Improvements in Apparatus for the Manufacture or Production of Butter, (for which I have obtained Letters Patent in Great Britain, dated August 21, 1889, and numbered 13,197, and in Germany dated September 1, 1889, and numbered 53,215;) and I do hereby declare that the following is a full, clear, and exact description of the invention, which will enable others skilled in the art to which it appertains to make and use the same.

This invention relates to a new apparatus for the churning or production of butter; and it consists of means for forcing purified and tempered air at a suitable temperature through the milk or cream from which the butter is to be made.

In the accompanying drawing, the figure represents one form in which I have contemplated embodying my invention, and said invention is fully disclosed in the following description and claim:

In the drawing, $a$ represents a bench or table.

$b$ is a vessel, (which I call the "converter,") of glass or other suitable material, for containing the milk or cream to be treated, and preferably formed with a lip or flange $b'$.

$c$ is a perforated false bottom in the vessel $b$.

$d$ is the cover of the vessel, having an opening $e$ at the top, partly inclosed by a cap $f$, and serrated round its lower edge at $g$.

$h$ is a pipe opening into the bottom of the vessel $b$ under the false bottom $c$, the said pipe coming from a vessel $i$, which I call the "filter."

$j$ is the cover of the filter, fitted air-tight, from which passes the pipe $h$, leading to the converter $b$.

$k$ is a wire-gauze or perforated false bottom in the filter.

$l$ is a pipe which opens under the false bottom $k$, and which comes from a blower A or other suitable source of compressed air.

$m$ is a discharge-cock for emptying the filter, and $n$ is a discharge-cock for emptying the vessel $b$.

$o$ is a stop-cock in the air-pipe $h$.

To manufacture butter by my apparatus, I proceed as follows: All the connections having been made between the blower, the filter $i$, and the vessel $b$, and the taps closed, I charge the filter $i$ about one-half full with clear cold water, preferably filtered or boiled. The cover is put on and made air-tight. I then charge the converter $b$ about one-half full with the milk or cream to be treated and put on the loose cover $d$ to stop the splashes. The blower is set in motion and the air-cock $o$ turned on at the converter $b$, and the air, as it leaves the blower, is driven to and liberated at the bottom of the filter $i$ and rises up through the perforated bottom $k$ and through the water therein in small globules, the false bottom $k$ serving to break up and allow of more completely washing the said air. The air then passes on by the pipe $h$, connecting the filter $i$ to the converter $b$, and entering the converter at the bottom thereof rises up through the perforated false bottom $c$ and through the material to be treated, and causes the change necessary to enable the fatty globules thereof to unite and form butter. It is very important to keep the milk or cream at a temperature of from 60° to 88° Fahrenheit, and to keep it as nearly as possible at a uniform temperature throughout the operation. I have found that the most successful results are attained by keeping the milk or cream at a temperature of about 70° to 75° Fahrenheit. This I accomplish by applying heat to the filter by means of a small lamp—such as $p$—of any convenient form. In like manner, also, may the cream or milk be cooled, if necessary, by the use of ice, cold water, or any other refrigerating medium. Any splashes of milk or cream which pass out through the opening $e$ in the cover $d$ of the converter pass back into the converter through the serrations $g$.

The butter made as hereinbefore described is in a granular form, and is most easily washed by cold water thrown into the converter, the buttermilk having been first drawn off by the cock $n$.

The use of the filter insures pure air, and also affords a more convenient means of applying most of the chemical agents used in preserving butter than is at present in use, as by placing such agents in the water in the filter the air as it passes through takes with it a portion of the preservative which is then distributed throughout the material being worked.

Having now described and ascertained the nature of my invention and in what manner it is to be performed, I wish it to be understood that I do not confine myself to the precise construction and arrangement of the apparatus described and illustrated for carrying out my invention, as it is obvious that the apparatus may vary according to different requirements; but

What I claim is—

In an apparatus for making butter, the combination, with the cream-receptacle, provided with a perforated diaphragm, the air filtering and tempering device, having a perforated diaphragm, and a connection from said air filtering and tempering device discharging into the cream-receptacle beneath its said diaphragm, of a continuous blast apparatus connected with the air filtering and tempering device and discharging beneath the diaphragm of the same, substantially as described.

WALTER COLE.

Witnesses:
    G. F. REDFERN,
    A. ALBUTT,
*Clerk to G. F. Redfern & Co., Patent Agents, 4 South Street, Finsbury, London, England.*